June 2, 1970        F. O. SOLHEIM        3,514,931
GRASS CLOG CLEARING DEVICE FOR ROTARY MOWERS
Filed Nov. 3, 1967
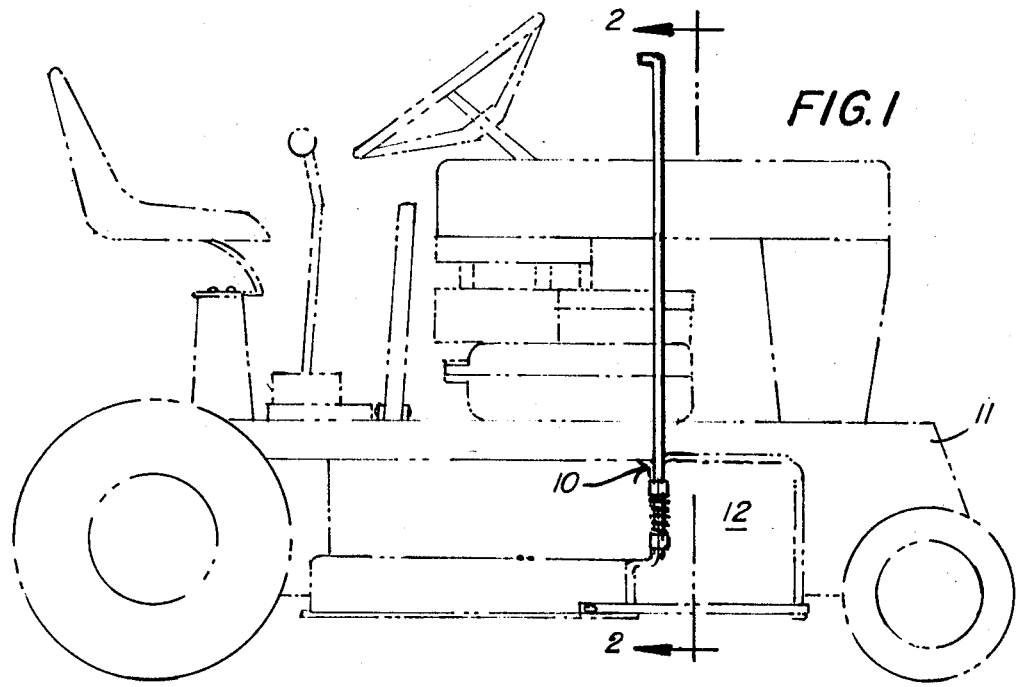
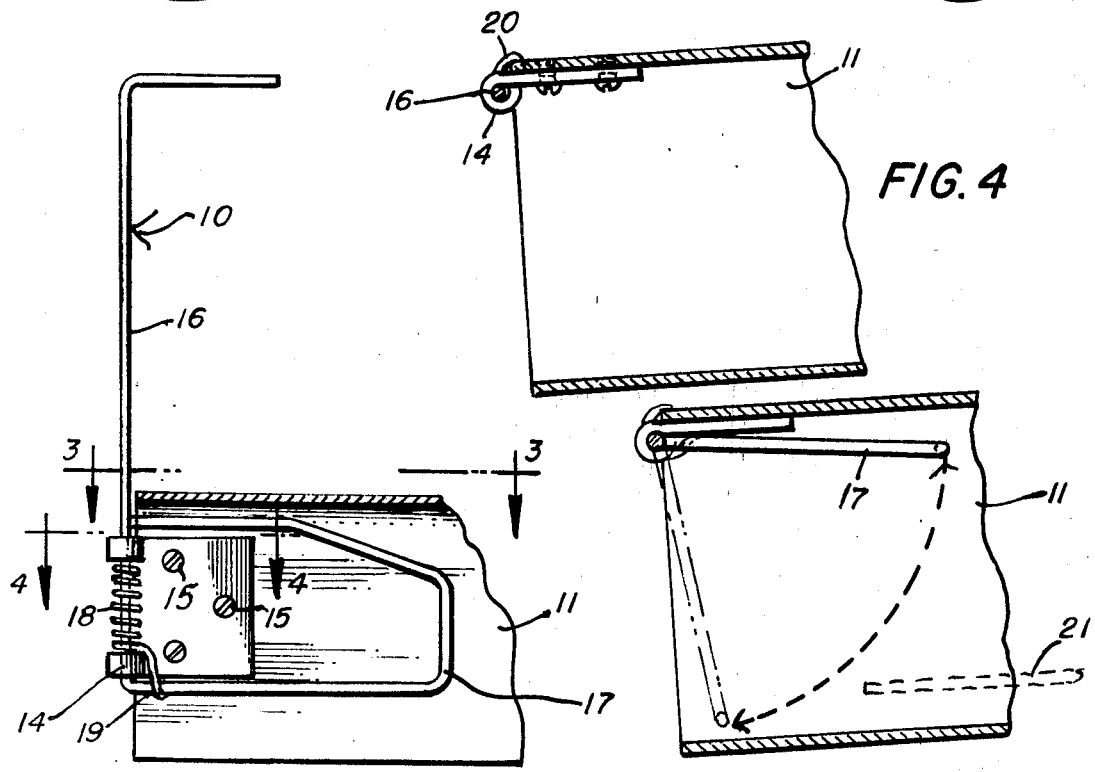
INVENTOR.
FINN O. SOLHEIM
BY

United States Patent Office 3,514,931
Patented June 2, 1970

3,514,931
GRASS CLOG CLEARING DEVICE
FOR ROTORY MOWERS
Finn O. Solheim, 179 Eileen Drive,
Bloomfield Hills, Mich. 48013
Filed Nov. 3, 1967, Ser. No. 680,540
Int. Cl. A01d 55/18
U.S. Cl. 56—255                          4 Claims

ABSTRACT OF THE DISCLOSURE

A grass clog ejecting apparatus for expelling clogs occluding the exit opening of a rotary mower having an arm pivotally mounted on the housing and movably spring biased against the housing swingable by a handle or pedal in an arc in a direction outwardly of the exit opening so as to eject an occluding clog; the arm being a wire member such as a loop to avoid interference with air circulated and centrifugally propelled grass cuttings so as to clear the clog without stopping grass cutting emission by the mower.

---

This invention relates to a device for clearing the grass clogs from a rotary mower while the mower is running.

Rotary mowers in general use a blade rotating about a vertical axis inside a housing in which an exit opening is formed for emitting the grass cuttings. However when the grass is wet, long, and/or green and juicy, the cuttings tend to adher to the interior of the housing and build up layer on layer due to the moisture and quantity of grass. The build-up of grass particles on the housing, especially adjacent the exit opening, tend to choke the mower reducing circulation of the air by the blade so that accumulation of grass cuttings in the itnerior of the housing increases very rapidly once it has started to occur and then quite often a build-up will procduce several clots or clogs of grass cuttings sufficiently large to occlude the exit opening of the mower and upon this happening the rotating blade cannot circulate the air through the opening and the accumulation of grass cuttings inside the mower housing packs behind the occluded opening and the blade then acts more as a blender to liquify the recirculating grass cuttings to a mash so that they adhere very readily to the housing and pack up. In other words once the build-up of grass cuttings starts the centrifugal ejection of grass cuttings by the blade and the air pumping aspects of the blade are rapidly reduced in efficiency.

In the prior art practice it was necessary to stop the mower and manually remove the cuttings and the grass clog from the exit opening of the mower. Less sensible or cautious operators attempt to dislodge the clog with their foot, their finger, or a stick, and this has resulted in major accidents because the blade turns at a speed so as to be invisible and is therefore not perceptible to the user in introducing his finger, foot or stick to dislodge the clog.

With the foregoing in view, it is a pirmary object of the invention to provide a device which is easily mountable on a rotary mower and which provides safe, efficient, and readily available means to dislodge clogs of grass from the exit opening of the mower housing without stopping the mower and with complete safety to the operator.

An object of the invention is to provide a device which can be manufactured as a complete accessory and which may be attached to any rotary mower with two or three bolts.

An object of the invention is to provide a clog dislodging device which may be incorporated on rotary mowers as original equipment by the manufacturer.

An object of the invention is to provide a device which allows the operator to dislodge the clogs from the exit opening of the mower and which is so adapted that it does not interfere with the air circulation of the mower housing either in its inactive position or while in use dislodging clogs.

An object of the invention is to provide a preferred embodiment having a spring biasing the clog dislodging arm against the mower housing and a handle or pedal attached to the arm so that an operator has only to twist the handle or pedal to effect dislodgement of a clog with the spring return of the device returning the arm to its inactive position automatically.

These and other objects of the invention will become apparent by reference to the following description of the grass clog clearing device for rotary mowers embodying the invention taken in connection with the accompanying drawing in which:

FIG. 1 is a elevational view of the device shown in mounted position on a riding rotary mower with the mower being shown in broken lines.

FIG. 2 is an enlarged cross sectional view of FIG. 1, taken on the line 2—2 thereof showing the device in elevation and the mower housing in cross-section.

FIG. 3 is a cross sectional view of FIG. 2 taken on the line 3—3 thereof showing the normal inoperative position of the arm in solid lines and the dislodging position of the arm and dotted lines with a broken line arc indicating the movement of the arm; and FIG. 4 is a cross ssectional view of FIG. 2 taken on the line 4—4 thereof showing the bolt connection between the device and the mower housing and the spring engagement with the mower housing at one end of the spring.

Referring now to the drawing wherein like numerals refer to like and corresponding parts throughout the several views, the safety grass clog removing device disclosed therein to illustrate the invention comprises an assembly 10 which is easily mountable on a mower housing 11 at the exit opening 12. The device may comprise a hinge member 14 which is secured to the housing 11 by bolts or machine screws 15. An arm 17 is pivotally mounted on the hinge member 14. A handle is connected to the arm 17. A spring 18 surrounds the arm 17 in the area of the hinge member 14. The spring 18 has one end 19 engaging the arm 17 and a reaction end 20 engaging the housing 11 or the hinge member 14. The torsion of the spring is such that it normally urges the arm 17 into a position lying closely adjacent and parallel to the wall of the housing 11 defining the exit opening 12 as shown in solid lines in FIGS. 2 and 3.

By turning the handle 16 the arm 17 is movable from the solid line position shown to the dotted line position seen in FIG. 3 so that any grass clog occluding the throat of the exit opening 12 is dislodged therefrom outwardly of the housing. It will be noted that the arc described by the arm 17 in its clog dislodging movement is adapted to bypass the blade 21. It is understood that the pivotal mounting may be made in any plane on the housing and that the handle 10 may be forshortened or the arm 17 operated as a foot pedal or extended in a different plane than as illustrated to facilitate operation in the position in which the device may be mounted on the mower housing.

It will thus be understood while the mower is running that the operator may simply turn the handle or trip the pedal to dislodge the clog and release it with the device automatically returning to its inactive position clear of the exit opening 12. It is understood that several repeated movements of the arm may be necessary to dislodge the accumulated clogs which are ejected from the mower housing upon the exit opening being initially cleared.

Although but a single embodiment of the invention has been shown and described in detail it is obvious that many changes may be made in the size, shape, detail, and arrangement of the various elements of the invention.

I claim:

1. A mower grass clog clearing device for rotary grass mowers having a housing equipped with walls defining an exit opening for emitting the grass cuttings which becomes occluded on occasions with accumulations of grass cuttings clogging the opening preventing further emission of grass cuttings operable with safety especially while the cutting blade is rotating, comprising, an ejector arm pivotally mountable on the mower housing adjacent the exit opening and having a normal non-obstructing position lying inwardly of the housing and adjacent the housing wall at the exit opening.

releasable means for holding said arm in said normal position, and a handle attached to said arm for pivoting said arm in a grass clog ejecting arc outwardly from its normal position adjacent the housing wall at the exit opening so as to eject a grass clog from the opening outwardly of the housing.

2. In a device as set forth in claim 1, said means for holding said arm in said normal position including a spring resiliently biasing said arm in said normal postion and springable to permit said arm to be pivoted to eject grass clogs.

3. In a device as set forth in claim 1, a hinge portion pivotally supporting said arm facilitating mounting said device as accessory equipment on mower housings.

4. In a device as set forth in claim 1, said arm constituting a substantially loop shaped wire from member so that it does not prevent ejection of grass cuttings by the blade when operated to eject grass clogs.

References Cited

UNITED STATES PATENTS

| 2,802,327 | 8/1957 | Thelanger | 56—25.4 |
| 3,095,985 | 7/1963 | Buschbom | 302—37 X |

FOREIGN PATENTS

| 854,598 | 9/1950 | Germany. | |

ROBERT PESHOCK, Primary Examiner

J. N. ESKOVITZ, Assistant Examiner